United States Patent [19]
Kade et al.

[11] Patent Number: 4,755,945
[45] Date of Patent: Jul. 5, 1988

[54] ADAPTIVE MODE ANTI-LOCK BRAKE CONTROLLER

[75] Inventors: Alexander Kade, Grosse Pointe Woods; Kevin G. Leppek, West Bloomfield, both of Mich.

[73] Assignee: General Motors Corporation, Detroit, Mich.

[21] Appl. No.: 913,001

[22] Filed: Sep. 24, 1986

[51] Int. Cl.$^4$ ............................................. B60T 8/82
[52] U.S. Cl. ..................... 364/426; 303/96; 303/100; 180/197
[58] Field of Search ............... 364/426; 303/95, 96, 303/110, 111; 180/197; 361/238

[56] References Cited

U.S. PATENT DOCUMENTS

| | | | |
|---|---|---|---|
| 3,840,278 | 10/1974 | Fleischer et al. | 303/111 |
| 3,964,796 | 6/1976 | Bremer | 303/107 |
| 4,313,166 | 1/1982 | Rode et al. | 364/426 |
| 4,349,876 | 9/1982 | Lindemann | 364/426 |
| 4,374,421 | 2/1983 | Leiber | 303/96 |
| 4,439,832 | 3/1984 | Sato et al. | 303/111 |
| 4,451,096 | 5/1984 | Gygax | 303/111 |
| 4,489,382 | 12/1984 | Jonner et al. | 303/110 |
| 4,538,700 | 9/1985 | Suzuki | 180/197 |
| 4,576,419 | 3/1986 | Leiber | 303/111 |
| 4,652,060 | 3/1987 | Miyake | 303/96 |
| 4,657,313 | 4/1987 | Fennel et al. | 303/111 |
| 4,668,022 | 5/1987 | Sato | 303/96 |

Primary Examiner—Gary Chin
Attorney, Agent, or Firm—Howard N. Conkey

[57] ABSTRACT

A wheel lock control system is described which utilizes both independent and select low modes of wheel lock controlled braking. When braking on a surface in which the coefficients of friction between the two sides of the vehicle are substantially different or when the vehicle is undergoing severe steering maneuvers while braking, the wheel lock control system utilizes a select low mode of braking for the vehicle rear wheels so as to maintain vehicle stability. However, when the four wheels are being braked on a substantially uniform coefficient of friction surface, the wheel lock control system utilizes an independent mode of braking for each of the wheels of the vehicle so as to minimize the vehicle braking distance.

4 Claims, 5 Drawing Sheets

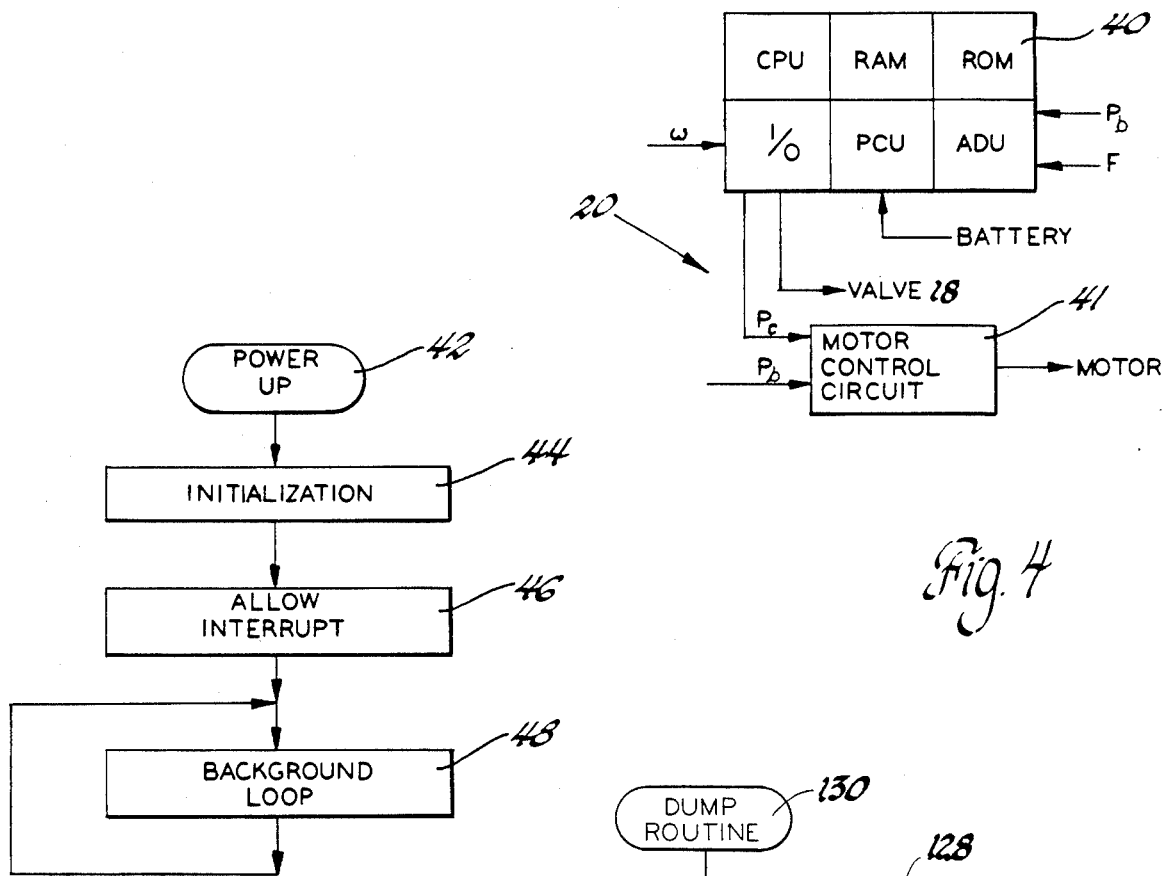
Fig. 4
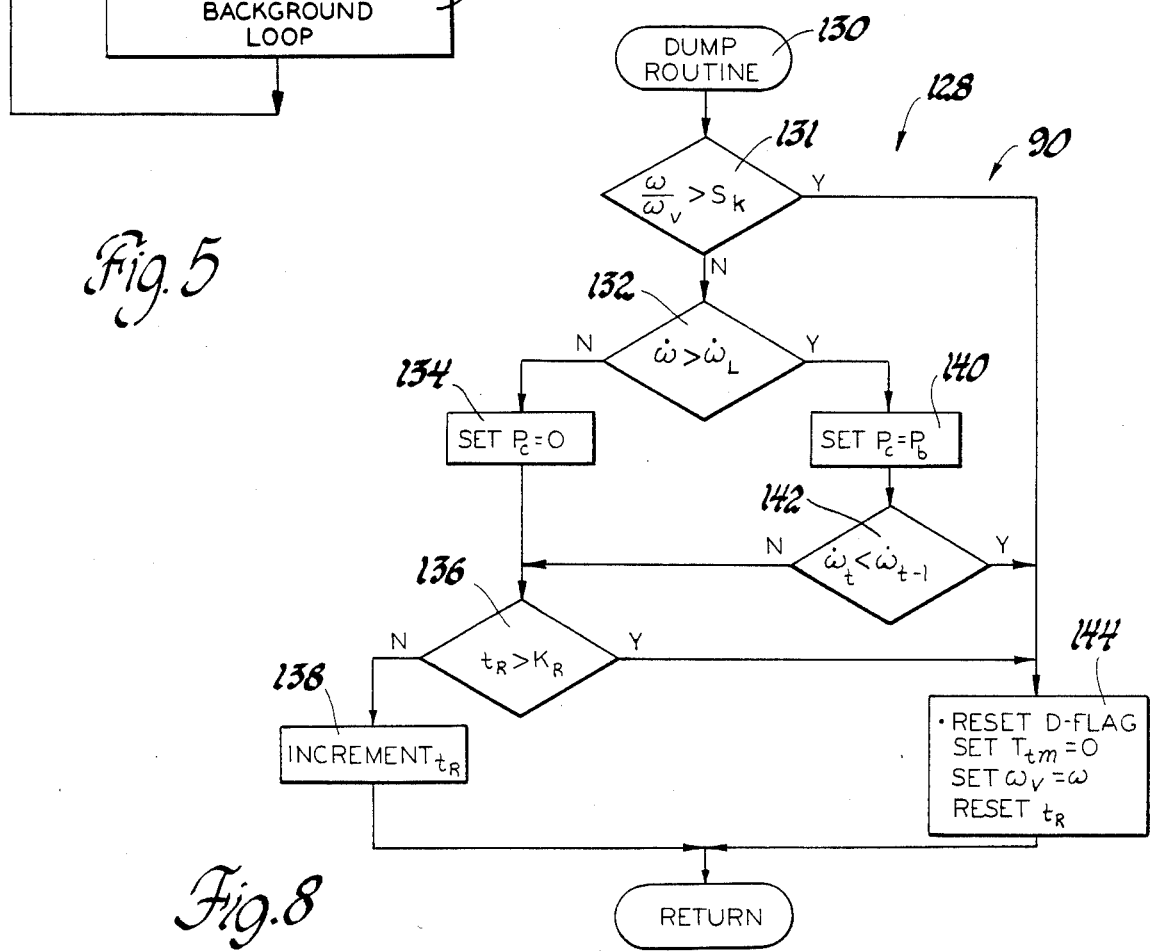
Fig. 5
Fig. 8

ADAPTIVE MODE ANTI-LOCK BRAKE CONTROLLER

BACKGROUND OF THE INVENTION

This invention relates to an anti-lock control system for vehicle wheel brakes.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reduced vehicle stopping distance and a deterioration in the lateral stability of the vehicle.

Numerous wheel lock control systems have been proposed to prevent the wheels from locking up while being braked. These systems generally prevent a wheel from locking by controlling the applied brake pressure when an incipient wheel lockup condition is sensed so as to maintain substantially the maximum possible braking force between the tire and road surface while at the same time preventing the wheel from operating in the unstable braking region.

Some of the known wheel lock control systems utilize an "independent" mode of braking wherein each of the front and rear vehicle wheels are controlled independently so as to establish the maximum possible braking force at each wheel during wheel lock controlled braking. By so maximizing the braking forces at each wheel, the stopping distance of the vehicle is minimized. However, under certain conditions, this mode of operation can lead to reduced vehicle stability. The conditions for this occurrence are either grossly different coefficients of friction between right and left sides of the vehicle, or severe steering maneuvers while braking.

Other forms of known wheel lock control systems utilize what is referred to as the "select low" mode of wheel lock controlled braking which provides for improved vehicle stability and steerability when the vehicle is being braked on a split coefficient of friction surface. In this form of wheel lock control system, the front brakes are typically controlled independently as above described but the rear wheel brakes are controlled such that the brakes of the rear wheel being braked on a high coefficient of friction surface is regulated in response to the conditions of the rear wheel being braked on a lower coefficient of friction surface. While this mode of braking increases the vehicle stopping distance, vehicle stability and steerability is improved. For example the lateral friction force of the rear wheel being braked on the high coefficient of friction surface is increased since it is being controlled to a low slip value.

SUMMARY OF THE INVENTION

The present invention provides for an improved wheel lock control system which utilizes both independent and select low modes of wheel lock controlled braking. When braking on a surface in which the coefficients of friction between the two sides of the vehicle are substantially different or when the vehicle is undergoing severe steering maneuvers while braking, the wheel lock control system of this invention utilizes a select low mode of braking for the vehicle rear wheels so as to maintain vehicle stability. However, when the four wheels are being braked on a substantially uniform coefficient of friction surface, the wheel lock control system of this invention utilizes an independent mode of braking for each of the wheels of the vehicle so as to minimize the vehicle braking distance.

In the embodiment hereinafter described, a difference in the coefficients of friction between the right and left sides of the vehicle or a severe steering maneuver while braking is sensed based on the difference in the determined braking force of the front wheels while braking.

DESCRIPTION OF THE DRAWINGS

The invention may be best understood by reference to the following description of a preferred embodiment and the drawings in which:

FIG. 4 is a diagram of the electronic controller of FIG. 2 that is responsive to brake system parameters for controlling the brake pressure to inhibit wheel lockup in accord with the principles of this invention; and FIGS. 5 thru 9 are diagrams illustrating the operation of the engine controller of FIG. 4.

DESCRIPTION OF THE PREFERRED EMBODIMENT

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b. \qquad (1)$$

Tire torque $T_t$ is related to the brake force coefficient $\mu$ between the tire and the road surface, the normal load $N$ on the tire and the wheel rolling radius $R$ and is defined by the expression $$T_t = \mu N R. \qquad (2)$$

For the free body consisting of the brake, wheel, and tire, the equation of motion is $$I_w \dot{\omega} + T_b - T_t = 0 \qquad (3)$$

where $I_w$ is the wheel moment of inertia and $\dot{\omega}$ is the wheel angular acceleration. When the difference between the tire torque and the brake torque is positive, the wheel accelerates; and when negative, the wheel decelerates.

Combining expressions 1 and 3, tire torque $T_t$ is defined as $$T_t = I_w \dot{\omega} + P_b K_b. \tag{4}$$

As can be seen, the tire torque can be calculated from values that are either known or can be measured. The wheel moment of inertia $I_w$ and the brake gain $K_b$ are known values, the value of brake pressure $P_b$ can be measured and $\dot{\omega}$ can be determined by differentiating the value of wheel speed which can be measured.

Figure 1:
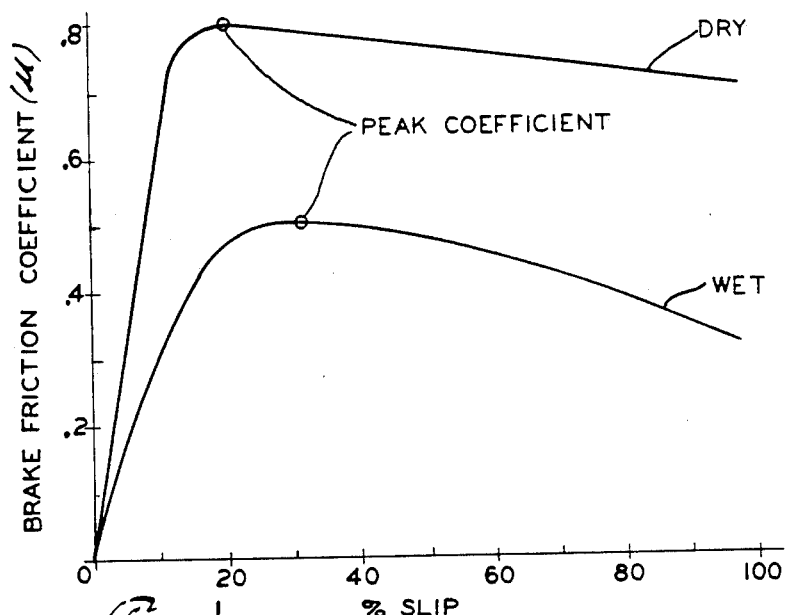
FIG. 1 is a diagram illustrating the brake force coefficient between a wheel and a road surface as a function of the percentage slip between the wheel and road surface for two road surface conditions.

The brake friction coefficient term $\mu$ of the tire torque $T_t$ is a nonlinear function of the magnitude of slip between the wheel and the road surface during braking and is dependent upon the road surface condition. FIG. 1 illustrates the brake friction coefficient $\mu$ as a function of percentage-wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the tire torque due to a decrease in the brake friction coefficient and high wheel deceleration values. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

In general, the brake control system identifies the value of the braking pressure $P_b$ that produces the maximum tire torque $T_t$. This is accomplished by continuously calculating the tire torque value $T_t$ of equation (4) during braking. Any time the calculated value is larger than any previously calculated value, the value of the tire torque and the braking pressure $P_b$ is stored so that the maximum tire torque and brake pressure producing it are known. When an incipient wheel lockup is detected, the brake pressure is dumped to allow the wheel speed to recover and the brake pressure is thereafter reapplied to the stored value to establish a braking condition in which the wheel slip is substantially at the critical slip value for the existing road surface condition. This results in substantially the maximum possible tire torque $T_t$ and minimum stopping distance for the road surface condition.

Figure 2:
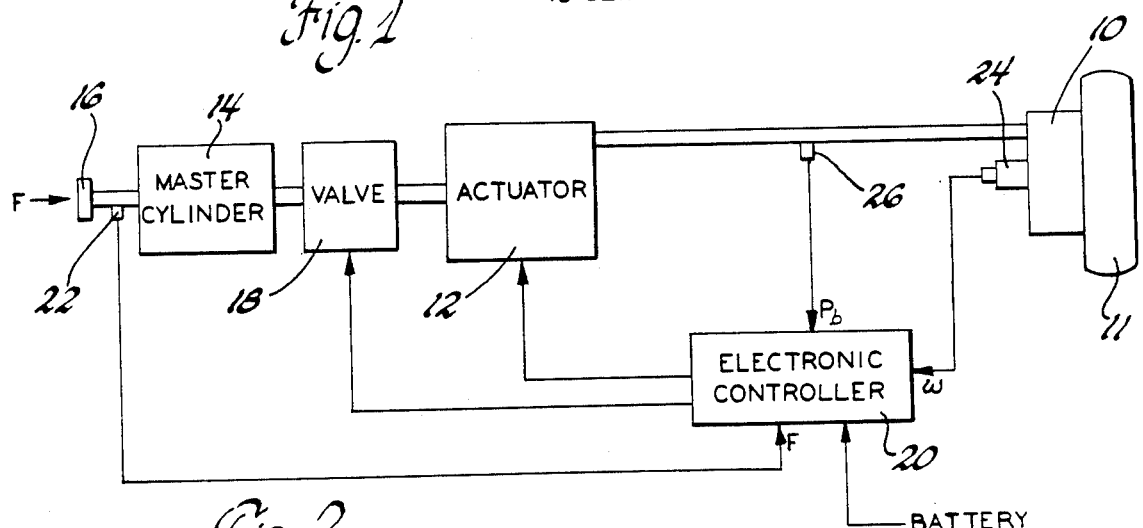
FIG. 2 is a general diagram of the braking system for controlling the brakes in accord with the principles of this invention.

A general overview of the wheel lock control system is illustrated in FIG. 2. The control system for the brake of a single wheel is illustrated, it being understood that the brakes of the remaining wheels of the vehicle are similarly controlled. A standard wheel brake 10 for a wheel 11 is actuated by controlled hydraulic pressure from one of two sources. The primary source is a motor driven actuator 12 and the secondary source is a standard master cylinder 14 controlled directly by the vehicle brake pedal 16. A normally open electromagnetic valve 18 is energized when the actuator 12 is operative to control the hydraulic pressure to the brake 10 so as to decouple the master cylinder 14 and brake pedal 16 from the hydraulic pressure output of the actuator 12. When the electromagnetic valve 18 is deenergized, the hydraulic pressure to brake 10 may be modulated directly by the brake pedal 16 and master cylinder 14.

The valve 18 is deenergized only during limited vehicle operating conditions such as low vehicle speed or during failed conditions of the primary hydraulic pressure source to permit brake pressure modulation by the master cylinder 14.

An electronic controller 20 is responsive to the outputs of a brake pedal force sensor 22 providing a signal that is a measure of the operator applied brake pedal force F, a wheel speed sensor 24 that provides a signal that is a measure of wheel speed $\omega$, and a pressure sensor 26 that provides a signal that is a measure of the hydraulic brake pressure $P_b$ applied to the brake 10 from the master cylinder 14 or the actuator 12. The electronic controller 20 is responsive to those signals to (a) energize the valve 18 when the wheel speed $\omega$ exceeds a value corresponding to a low vehicle speed such as 3 mph, (b) control the actuator 12 so as to apply a hydraulic pressure $P_b$ to the brake 10 that is proportional to the brake force F times a gain constant G for providing power assist during normal braking conditions, and (c) limit the pressure $P_b$ applied to the brake 10 for wheel lock control.

Figure 3:
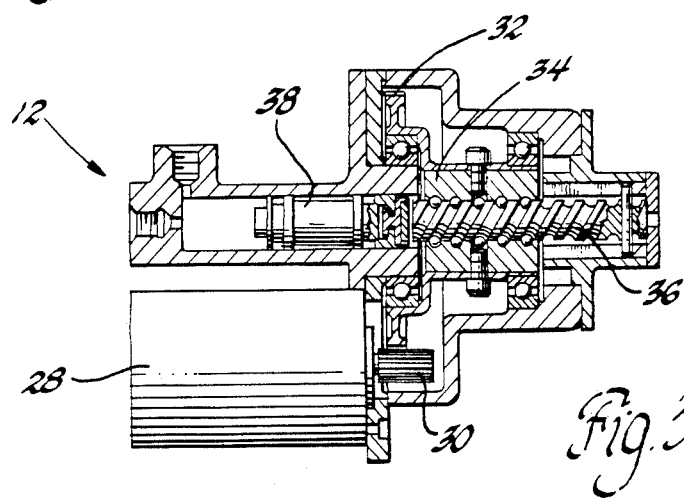
FIG. 3 is a longitudinal cross-sectional view of the actuator of FIG. 2 for modulating the brake pressure to prevent wheel lockup.

Referring to FIG. 3, the actuator 12 in the preferred embodiment includes a DC torque motor 28 whose output shaft drives an input gear 30 which in turn rotatably drives an output gear 32. The drive member 34 of a ball screw actuator is secured for rotation with the output gear 32. The drive member 34 engages and axially positions the driven member 36 of the ball screw actuator. The driven member 36 drives a piston 38 to control the hydraulic pressure output of the actuator 12. The torque output of the motor 28 is translated to a directly related hydraulic pressure $P_b$ output of the actuator 12 that is applied to the brake 10.

As illustrated in FIG. 4, the electronic controller 20 takes the form of a digital computer 40 and a motor control circuit 41. The digital computer is standard in form and includes a central processing unit (CPU) which executes an operating program permanently stored in a read-only memory (ROM) which also stores tables and constants utilized in controlling the hydraulic pressure input to the brake 10. Contained within the CPU are conventional counters, registers, accumulators, flag flip flops, etc. along with a clock which provides a high frequency clock signal.

The computer 40 also includes a random access memory (RAM) into which data may be temporarily stored and from which data may be read at various address locations determined in accord with the program stored in the ROM. A power control unit (PCU) receives battery voltage and provides regulated power to the various operating circuits in the electronic controller 20.

The computer 40 further includes an input/output circuit (I/O) that in turn includes a discrete output section controlled by the CPU to provide a control signal to the valve 18. In controlling the brake 10, the computer outputs a digital signal to the motor control circuit 41 via the I/O representing a desired value of the hydraulic brake pressure. The motor control circuit 41 converts the digital signal representing the desired pressure to an analog signal which is compared with the actual measured value of the brake pressure $P_b$. By standard closed loop adjustment that may include both proportional and integral terms, the motor 28 current is controlled so that the actual measured brake pressure $P_b$ is made equal to the desired pressure.

The I/O also includes an input counter section which receives a pulse output from the wheel speed sensor 24 having a frequency representing wheel speed $\omega$. Wheel speed $\omega$ is then determined by counting clock pulses between wheel speed pulses.

An analog-to-digital unit (ADU) is included which provides for the measurement of analog signals. The analog signals representing conditions upon which the hydraulic brake pressure to the brake 10 is based are supplied to the ADU. In the present embodiment, those signals include the brake pressure value $P_b$ from the pressure sensor 26 and the output of the brake pedal force sensor 22 providing a measure of the pedal force F. The analog signals are sampled and converted under the control of the CPU and stored in ROM designated RAM memory locations.

Referring to FIG. 5, when power is first applied to the system such as when the vehicle ignition switch is rotated to its "on" position, the computer program is initiated at point 42 and then proceeds to a step 44 where the computer 40 provides for system initialization. For example, at this step initial values stored in the ROM are entered into ROM designated RAM memory locations and counters, flags and timers are initialized.

After the initialization step 44, the program proceeds to a step 46 where the program conditions the controller 20 to allow interrupts to occur and then to a background loop 48 which is continuously repeated. This loop may include, for example, diagnostic routines. In the preferred embodiment of this invention, an interrupt is provided by the CPU at 5 millisecond intervals. Following each interrupt, the execution of the background loop 48 is interrupted and the routines for establishing the hydraulic brake pressure to each of the front and rear wheel brakes are executed.

Figure 6:
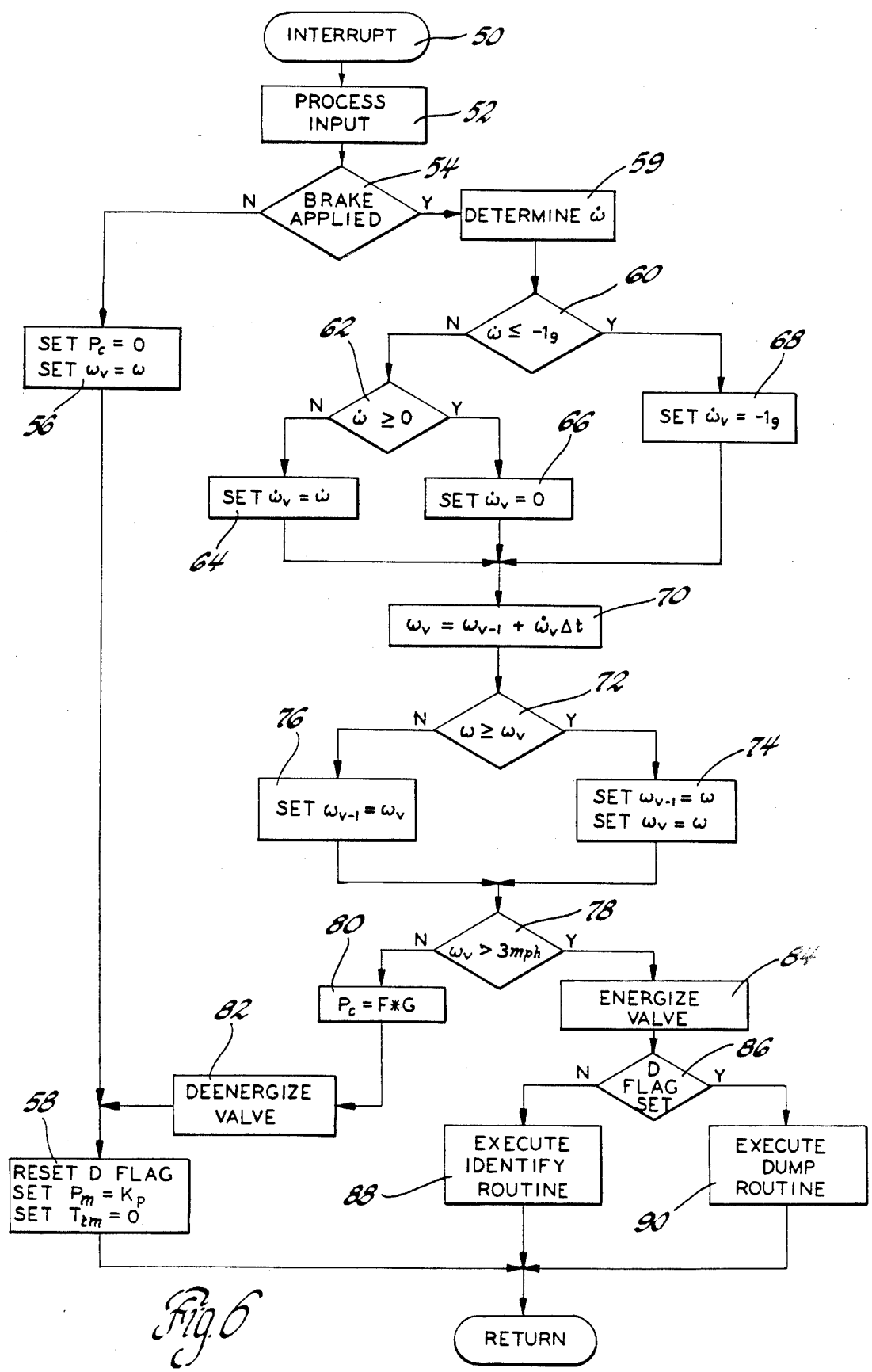
Figure 7:
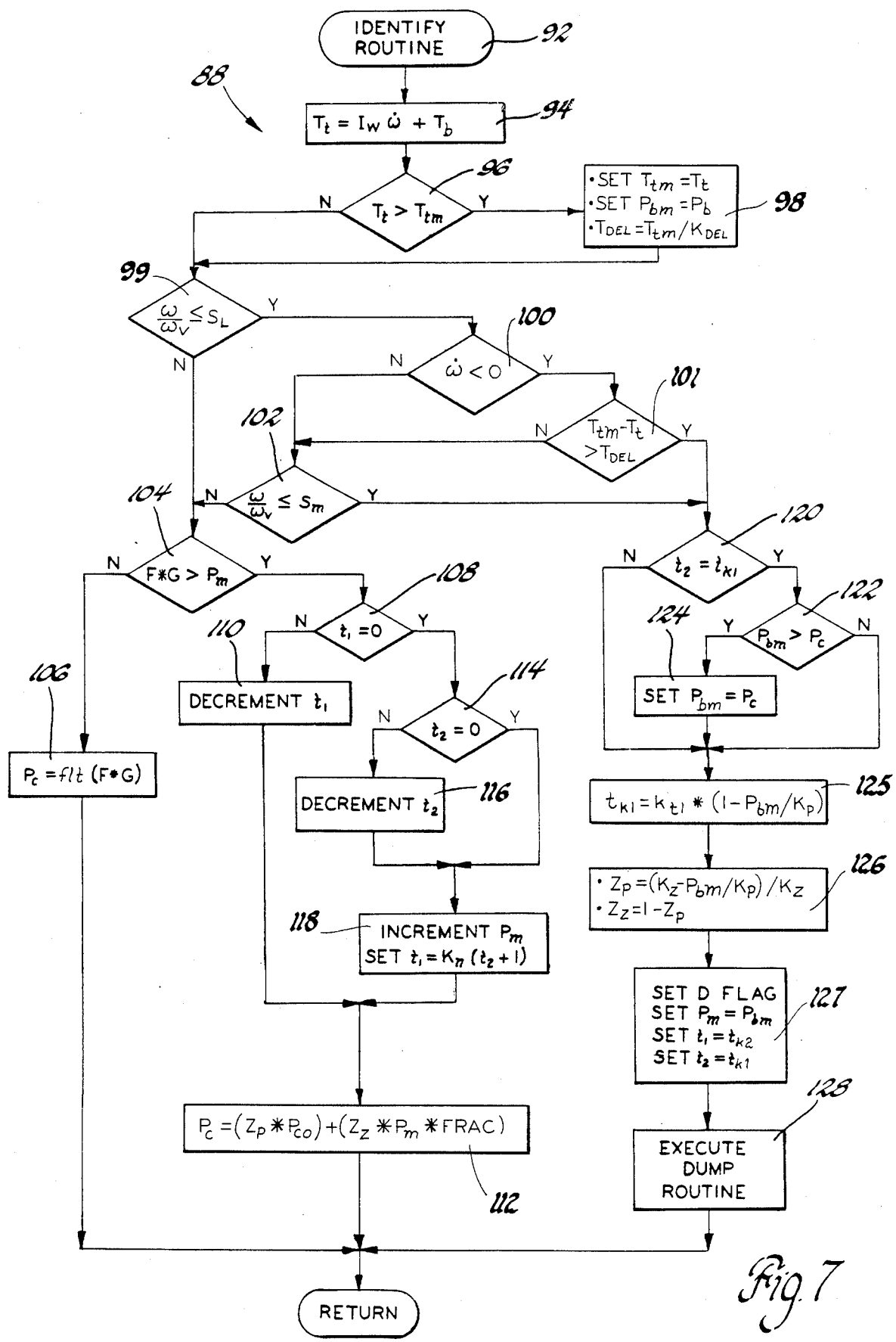

Control of the front wheel brakes of the vehicle will first be described. The front wheel brakes are controlled by the controller 20 independently in identical manner by identical program routines. FIGS. 6–8 combined illustrate the routines executed by the electronic controller in controlling the hydraulic brake pressure $P_b$ to the brake of one of the front wheels.

Referring to FIG. 6, the five millisecond interrupt routine is illustrated. This routine is entered at step 50 and proceeds to a step 52 where the last measured speed $\omega$ of the wheel is saved and the new values of the speed $\omega$ of the wheel, brake pedal force F and brake line pressure $P_b$ to the wheel brake are read and stored in ROM designated RAM memory locations. Next, the program proceeds to a step 54 where it is determined whether or not the operator is commanding brake application. The brakes are considered applied if the value of the brake pedal force F is greater than zero. If the brakes are not applied, the program proceeds to a step 56 where a brake pressure command value $P_c$ for the wheel brake is set equal to zero. Also at this step, the speed of the vehicle as represented by the speed $\omega_v$ of a hypothetical unbraked wheel is set equal to the wheel speed measured at step 52. Since the brakes are not applied, the wheel slip is substantially at zero so that the actual and hypothetical wheel speeds can be equated.

From step 56, the program proceeds to a step 58 where a D-flag (represented by the state of a flip-flop or a RAM memory location) is reset to condition the program to execute an identification routine (illustrated in FIG. 7) which identifies the brake pressure producing the critical wheel slip value and therefore the maximum possible braking effort and which establishes the identified brake pressure following the sensing of an incipient wheel lockup condition. As will be described, the D-flag is set following the sensing of an incipient wheel lockup condition in accord with the principles of this invention to condition the program to execute a dump routine (illustrated in FIG. 8) to release the brake pressure and allow the wheel speed to recover. Also at step 58, the maximum allowable brake line pressure $P_m$ is set equal to a calibration constant $K_p$ such as 1500 psi and a RAM memory location storing the value of the maximum calculated tire torque value $T_{tm}$ is set equal to zero. Thereafter, the program exits interrupt routine for the respective wheel.

The foregoing steps 52 thru 58 are continuously repeated at 5 millisecond intervals as long as the vehicle operator does not command brake application. However, when a force F is applied to the brake pedal, the program proceeds from step 54 to a series of steps that provide an estimation of the value of vehicle speed $\omega_v$ as represented by the speed of a hypothetical unbraked wheel. It is noted that the initial value of $\omega_v$ was set equal to the actual wheel speed $\omega$ at step 56 prior to operation of the brake pedal 16. This series of steps begins at step 59 where the rate of change in wheel speed $\dot{\omega}$ is determined from the old value of wheel speed saved at step 52 and the new value stored at step 52. The determined rate of change of wheel speed is then compared with a constant deceleration of 1 g at step 60. The 1 g deceleration value represents the maximum possible vehicle deceleration. When wheel deceleration is less than 1 g, it is assumed that the vehicle is decelerating at the same rate as the wheel 11. If, however, the wheel deceleration exceeds 1 g, it is assumed that the vehicle deceleration remains at the maximum value of 1 g.

If the wheel deceleration is less than or equal to 1 g, the program proceeds from step 60 to a step 62 where $\dot{\omega}$ is compared to zero. If the comparison indicates wheel deceleration, the program proceeds to step 64 where the rate of change of vehicle speed $\dot{\omega}_v$ is set equal to the actual measured rate of change of wheel speed. If, however, the comparison at step 62 indicates no change in wheel speed or wheel acceleration, the program proceeds to a step 66 where the rate of change of vehicle speed $\dot{\omega}_v$ is set equal to zero.

Returning to step 60, if it is determined that the wheel deceleration is 1 g or greater, the program proceeds to a step 68 where $\dot{\omega}_v$ is set equal to the maximum possible vehicle deceleration of 1 g.

From the respective steps 64, 66 or 68, the program proceeds to a step 70 where vehicle speed $\omega_v$ is estimated. This estimation is based on an initial value of vehicle speed $\omega_{v-1}$ determined during the previous execution of the interrupt routine and the rate of change of vehicle speed determined at step 64, 66 or 68 over the five millisecond interval $\Delta t$ between interrupt periods.

From step 70, the program proceeds to step 72 where the actual wheel speed $\omega$ measured at step 52 is compared to the vehicle speed $\omega_v$ determined at step 70. If the wheel speed is equal to or greater than the vehicle speed (which cannot occur during braking of the wheel), the value of vehicle speed is corrected at step 74 by setting the vehicle speed $\omega_v$ equal to wheel speed $\omega$ and the initial vehicle speed $\omega_{v-1}$ to be used at step 70 in the next execution of the interrupt routine is set equal to wheel speed $\omega$. If at step 72 the wheel speed $\omega$ is determined to be less than the vehicle speed $\omega_v$, the program proceeds to a step 76 where the initial vehicle speed $\omega_{v-1}$ to be used at step 70 during the next execution of the interrupt routine set equal to the value of vehicle speed determined at step 70.

Following step 74 or step 76, the program proceeds to a step 78 where the vehicle speed is compared to a calibration constant such as 3 mph. If the vehicle speed is less than 3 mph, the program proceeds to a step 80 where the commanded brake line pressure $P_c$ is set equal to the value of the brake pedal force F times a gain constant G for providing power assisted braking. Thereafter, the program proceeds to a step 82 where the valve 18 of FIG. 2 is deenergized and then to the step 58 previously described.

If the vehicle speed is greater than 3 mph, the program proceeds from step 78 to step 84 where the valve 18 is energized to decouple the master cylinder 14 from the actuator 12. Brake application is thereafter provided solely via the actuator 12 as controlled by the electronic controller 20. From step 84, the program proceeds to a step 86 where the state of the D-flag is sampled. If the D-flag is reset to condition the program to execute the identify routine, the program proceeds to a step 88 where the identify routine is executed.

If step 86 determines that the D-flag is set, the program is conditioned to execute a dump routine, and the program proceeds to a step 90 where the dump routine is executed. During this routine, the pressure to the brake 10 is released to allow the speed of the wheel 11 to recover from an incipient lockup condition. Following the steps 88 or 90, the program exits the interrupt routine for the respective wheel.

The program executes an interrupt routine as described for each of the remaining vehicle wheels following each 5 millisecond interrupt after which the program returns to the background loop 48 of FIG. 5.

Referring to FIG. 7, the identify routine 88 of FIG. 6 is illustrated. This routine (A) provides for power assisted braking, (B) identifies the brake line pressure producing the critical wheel slip corresponding to the maximum possible braking force between the tire and the road surface, (C) senses an incipient wheel lockup condition and conditions the program to execute the dump routine to allow wheel recovery from the lockup condition and (D) reestablishes the brake line pressure to substantially the identified pressure producing the critical slip value.

The identify routine is entered at point 92 and proceeds to a step 94 where the value of the tire torque $T_t$ is calculated in accord with the equation (4) from the wheel deceleration $\dot\omega$ determined at step 59, the brake line pressure $P_b$ measured at step 52 and the known values of wheel inertia $I_w$ and brake gain $K_b$. From step 94, the program proceeds to steps 96 and 98 that function to identify the brake pressure producing the maximum value of tire torque and to determine the decrease in tire torque from the peak value that represents an incipient wheel lockup condition. At step 96, the tire torque $T_t$ calculated at step 94 is compared with the largest previously calculated value $T_{tm}$ stored in memory. If the value calculated at step 94 is greater than the stored value $T_{tm}$, the program proceeds to a step 98 where the stored value $T_{tm}$ is set equal to the larger value calculated at step 94, a stored value of brake line pressure $P_{bm}$ representing the brake line pressure corresponding in time to the stored maximum calculated value of tire torque is set equal to the brake line pressure $P_b$ measured at step 52 and a stored value of the decrease in tire torque $T_{DEL}$ from the stored peak value $T_{tm}$ that represents an incipient wheel lockup condition is updated. In this embodiment, $T_{DEL}$ is a predetermined percentage of the peak calculated tire torque value $T_{tm}$. Accordingly, the value of $T_{DEL}$ stored at step 98 is set equal to $T_{tm}/K_{DEL}$ where $K_{DEL}$ is a calibration constant establishing the percentage drop in tire torque as the wheel slip exceeds the critical slip value that represents an impending wheel lockup condition. For illustration purposes only, $K_{DEL}$ may be 4.0 establishing a 25% decrease in tire torque $T_t$.

The foregoing sequence of steps 96 and 98 are repeated with each execution of the identify routine as long as the tire torque is increasing. If step 96 should determine that the calculated value of tire torque $T_t$ is less than the stored maximum calculated value $T_{tm}$, step 98 is bypassed. This will occur when the brake pressure $P_b$ results in a wheel slip that exceeds the critical value which in turn results in a decrease in the tire torque. The stored value of brake pressure $P_{bm}$ then represents the brake line pressure establishing the critical wheel slip value and therefore the maximum braking effort and the stored value of $T_{DEL}$ is the decrease in tire torque representing an incipient wheel lockup condition.

The present invention utilizes the values of $P_{bm}$ for each of the front wheels to detect braking on a split coefficient of friction surface wherein the left and right wheels of the vehicle are being braked on surfaces having different coefficient of friction or to detect a severe steering maneuver while braking. This is based on the fact that the value of $P_{bm}$ for each of the front wheels will be substantially equal to one another when both wheels are at their respective critical slip values when being braked on surfaces having substantially equal coefficients of friction and in the absence of a severe steering maneuver. A difference in the stored values of $P_{bm}$ for each of the front wheels is indicative of the braking of the front wheels on a split coefficient of friction surface with the magnitude of the difference representing the difference between the coefficients of friction of the surfaces on the left and right sides of the vehicle.

The program next determines whether or not an incipient wheel lock condition exists. At step 99 the ratio $\omega/\omega_v$ is compared with a reference value $S_L$ above which stable braking takes place. In one embodiment, $S_L$ may equal 0.92 representing 8% wheel slip. A ratio less than $S_L$ indicates a potential for unstable braking. Particularly, if the wheel slip exceeds the value represented by $S_L$ and the wheel is decelerating, a decrease in the tire torque $T_t$ to a value below the stored maximum tire torque value $T_{tm}$ by an amount equal to $T_{DEL}$ is a result of wheel slip exceeding the critical slip value as the wheel decelerates toward a lockup condition.

If step 99 determines that a potential exists for unstable braking, the program proceeds to determine if an incipient wheel lockup condition exists based on the decrease in the tire torque from the peak value (if the wheel is decelerating) or based on the magnitude of wheel slip. Step 100 determines if wheel acceleration is negative. If negative the program proceeds to step 101 to determine if the tire torque $T_t$ calculated at step 94 is less than the peak tire torque $T_{tm}$ stored at step 98 by the value $T_{DEL}$ or greater. If the tire torque $T_t$ has not decreased from the peak value by the value $T_{DEL}$, representing stable braking based on this parameter or if wheel acceleration is not less than 0 as determined at step 100, the program proceeds to step 102 where the ratio $\omega/\omega_v$ is compared with a reference value $S_m$ (such as 0.7) which represents a wheel slip value that exceeds the largest possible critical wheel slip value for any road surface condition. A ratio less than $S_m$ indicates that braking has become unstable and an incipient wheel lockup condition exists.

If either of the steps 99 and 102 indicates a stable braking condition, the program proceeds to a step 104 where the value of the operator requested brake pressure that is equal to the applied pedal force F times the power assist gain factor G is compared with a maximum allowable brake line pressure $P_m$. If the product is less than the maximum value, the program proceeds to a step 106 where the commanded brake pressure value $P_c$ is adjusted toward the operator requested pressure in accord with a first order lag filter equation to provide power assisted braking. Thereafter, the program exits the identify routine and returns to the background loop 48.

If at step 104 it is determined that the operator requested brake pressure is greater than the maximum allowable pressure $P_m$, the program proceeds to a pressure ramp routine where, through repeated executions of the identify routine, the maximum allowable brake pressure $P_m$ and the commanded brake line pressure $P_c$ are ramped up at rates dependent upon the tire-road interface condition until step 104 detects that the maximum allowable brake pressure $P_m$ has become greater than the operator requested pressure or, if the operator requested brake pressure results in an unstable braking condition, until the commanded brake pressure results in an incipient wheel lockup condition at which time the brake pressure establishing the critical slip value has been identified by the steps 96 and 98 as well as the value of $T_{DEL}$ to be used at step 101 in determining whether or not an incipient wheel lockup condition exists. The brake pressure identified is used to reestablish the commanded brake pressure after the wheel recovers from the incipient lockup condition. The result of the ramping of the brake pressure is a periodic low frequency reidentification of the brake pressure producing the critical wheel slip value.

The routine for ramping the brake pressure begins at a step 108 where the value of a time $t_1$ in a RAM timing register is compared to zero. The initial value of time $t_1$ establishes a delay in the ramping of the commanded brake pressure $P_c$. Thereafter, the time $t_1$ functions in establishing the ramp rate. If the time $t_1$ is greater than zero, the program proceeds to a step 110 where the time $t_1$ is decremented. Thereafter, at step 112, the program proceeds to adjust the commanded brake pressure $P_c$ toward a predetermined fraction FRAC of the maximum allowable brake pressure $P_m$ in accord with the filter equation $$P_c = (Z_p \cdot P_{co}) + (Z_z \cdot P_m \cdot FRAC) \tag{5}$$

where $Z_p$ and $Z_z$ are values established as will be described based on the value of the stored peak brake pressure $P_{bm}$ so that $P_c$ is ramped at a rate dependent upon the road-tire friction coefficient and $P_{co}$ is the prior value of $P_c$. The time constant of this expression is generally small so that the brake pressure $P_b$ is quickly ramped toward the maximum allowable pressure $P_m$. By setting the maximum allowable brake pressure $P_m$ to the stored pressure $P_{bm}$ after an incipient wheel lockup condition is sensed (as will be described), the commanded pressure established upon repeated executions of step 112 will be the predetermined fraction FRAC of the pressure producing the critical wheel slip. In one embodiment, FRAC is 0.9 so that the resultant brake pressure produces substantially the critical wheel slip value.

As long as an incipient wheel lock condition is not detected and the operator requested brake pressure is greater than the maximum allowable brake line pressure $P_m$, the steps 108 thru 112 are repeated at the five millisecond interrupt interval until $t_1$ has been decremented to zero. After $t_1$ has been decremented to zero, the program proceeds from step 108 to step 114 where the time $t_2$ in a RAM timing register is compared to zero. If the time $t_2$ is greater than zero, the program proceeds to a step 116 where the time $t_2$ is decremented.

Following step 116 or step 114, the program proceeds to a step 118 where the maximum allowable brake pressure is incremented and the time $t_1$ is set equal to $K_n(t_2+1)$. Thereafter, the steps 114 thru 118 will be bypassed upon repeated executions of the identify routine until $t_1$ is again decremented to zero. From this it can be seen that the maximum allowable brake pressure $P_m$ is periodically incremented at intervals determined by $K_n$ and $t_2$. When $t_2$ is decremented to zero, the maximum allowable brake line pressure $P_m$ is incremented with each $K_n$ executions of the identify routine. The initial value of $t_2$ is based on the stored peak brake pressure $P_{bm}$ as will be described so that $P_m$ and therefore $P_c$ is ramped at a rate dependent upon the tire-road friction coefficient.

Following step 118, the program proceeds to step 112 where the commanded brake line pressure $P_c$ is again set as previously described. Repeated executions of the foregoing steps function to increase the commanded brake pressure $P_c$ exponentially. This increase will be continued until (A) an incipient wheel lock condition is forced so as to force a reidentification of the brake pressure producing the critical slip value via the steps 96 and 98 or (B) the operator requested brake pressure becomes less than the maximum allowable pressure $P_m$.

If the commanded brake pressure $P_c$ is increased to a point resulting in the wheel slip value becoming greater than the critical slip value, the wheels then quickly approach a lockup condition. This incipient wheel lock condition is detected at step 101 or step 102. When the incipient wheel lockup condition is detected, the brake line pressure $P_{bm}$ in memory at that time is the brake line pressure producing the critical wheel slip value and therefore the maximum possible tire torque.

After a wheel lockup condition has been sensed, the program proceeds to a step 120 where the time $t_2$ is compared with a time $t_{k1}$. As will be seen, these two values will be equal only if a wheel lockup condition is sensed within a predetermined constant time period $t_{k2}$ (such as 500 ms) after the brake pressure is reestablished after recovery from an incipient wheel lockup condition. A wheel lockup occurring within this period after reapplication of the brake pressure implies the application of an unstable brake pressure producing an incipient wheel lockup condition. If this condition exists, the program proceeds to a step 122 where the brake pressure $P_{bm}$, stored at step 98 and identified as the pressure establishing the critical wheel slip value, is compared with the commanded brake pressure $P_c$ which resulted in the incipient wheel lockup condition. If greater, the program proceeds to a step 124 where the stored value of $P_{bm}$ is corrected to the commanded pressure $P_c$. This condition represents an error in the calculation of the tire torque either through changes in the brake line coefficients or errors in various constants used in the determination of the calculation of the tire torque $T_t$. Since the brake line pressure producing the critical slip value can never be greater than the commanded brake line pressure $P_c$ that resulted in an incipient wheel lock condition, the value of $P_{bm}$ is reduced to the value of $P_c$ causing the incipient wheel lock condition.

From step 120 if the time $t_2$ is not equal to $t_{k1}$, from step 122 if $P_{bm}$ is less than $P_c$, or from step 124, the program proceeds to a step 125 where the value of $t_{k1}$ is set equal to $k_{t1}(1-P_{bm}/K_p)$ where $k_{t1}$ is a calibration constant and $k_p$ is the limit of the brake pressure as described with respect to step 58. From the above expression, it can be seen that $t_{k1}$ varies inversely with the brake pressure $P_{bm}$ producing the maximum braking effort. As will be seen, this results in a rate of increase in the brake pressure via the steps 114, 116 and 118 that varies directly with the peak calculated tire torque $T_{tm}$ stored at step 98.

At step 126, the values of $Z_p$ and $Z_z$ to be used in the filter equation (5) in step 112 are established. $Z_p$ is set equal to the expression $(K_z - P_{bm}/K_p)/K_z$ where $K_z$ is a calibration constant. In one embodiment, $K_z$ was selected to be 5.0 resulting in $Z_p$ being equal to approximately 0.8 when braking on a surface having a high coefficient. $Z_z$ is set equal to $1-Z_p$. As can be seen, the values of $Z_p$ and $Z_z$ are dependent upon the identified brake pressure $P_{bm}$ producing the peak tire torque $T_{tm}$ such that the filter equation (5) has a time constant that decreases with increasing values of $P_{bm}$. This results in a more rapid application of brake pressure for road surfaces having a higher coefficient of friction.

At step 127, the D-flag is set to condition the program to execute the dump routine and certain initial conditions for reapplication of brake pressure are established. The initial conditions include setting the maximum allowable brake pressure $P_m$ equal to the stored value of brake pressure $P_{bm}$ (the brake pressure identified as producing the critical wheel slip value), setting the time $t_1$ equal to the constant $t_{k2}$ and setting the time $t_2$ equal to the value $t_{k1}$ previously described which makes the initial value of $t_2$ dependent upon $P_{bm}$ to control the rate of increase of $P_m$ as a function of the road surface condition as previously described.

The program next proceeds to a step 128 where the dump routine is executed. Thereafter, during executions of the 5 ms interrupt routine of FIG. 6, the identify routine is bypassed via the step 86 and the dump routine 90 is executed until the D-flag is again reset.

The dump routine executed at step 128 of the identify routine of FIG. 7 and at step 90 of the interrupt routine of FIG. 6 is illustrated in FIG. 8. This routine is entered at point 130 and proceeds to step 131 where wheel slip represented by the ratio of wheel speed $\omega$ to the speed $\omega_v$ of the hypothetical unbraked wheel is compared to a constant $S_k$ representing wheel speed approaching vehicle speed. $S_k$ may be, for example, 0.92 representing a wheel slip of 8 percent. If the ratio is less than $S_k$, the program proceeds to a step 132 where wheel acceleration $\dot{\omega}$ is compared with a low value $\dot{\omega}_L$ such as a value representing 1 g. If the wheel speed has not yet begun to accelerate at this level in its recovery from the incipient lockup condition, the program proceeds to a step 134 where the commanded brake pressure $P_c$ is set to zero to allow the wheel speed to recover from the incipient wheel lockup and toward vehicle speed. From step 134,
the program compares at step 136 the time $t_R$ that the brake pressure has been dumped with a maximum allowable time $K_R$ beyond which the brake pressure is to be reapplied even if recovery from the lockup condition has not been detected. If the time period $K_R$ has not been exceeded, the time $t_R$ is incremented at step 138 and the program returns to the background loop 48 of FIG. 5.

Returning to step 132, if the wheel acceleration $\dot{\omega}$ has exceeded $\dot{\omega}_L$, the commanded brake pressure $P_c$ is set at step 140 equal to the then existing brake pressure $P_b$ to effect a hold of the brake pressure until wheel speed recovery is detected.

At step 142, the present wheel acceleration $\dot{\omega}_t$ is compared to the previous wheel acceleration $\dot{\omega}_{t-1}$. If wheel acceleration is increasing indicating that the wheel slip is still decreasing toward the critical slip value, the program proceeds to the step 136 previously described.

If step 131 detects wheel speed recovery based on wheel slip decreasing to a value below that represented by $S_k$ or if step 142 detects that the wheel slip is less than the critical slip value represented by a decrease in wheel acceleration or if step 136 detects a brake pressure dump duration exceeding $K_R$, the program proceeds to a step 144 where the D-flag is reset to condition the program to execute the identify routine of FIG. 7. Also at this step, the maximum value of calculated tire torque $T_{tm}$ is set to zero so that the identify routine is conditioned to reidentify the brake pressure establishing the critical wheel slip value, the hypothetical unbraked wheel speed $\omega_v$ is set equal to the last measured wheel speed $\omega$ and the time $t_R$ is reset. The program then exits the dump routine of FIG. 8 and returns to the background loop 48.

During the following executions of the interrupt routine of FIG. 6 at the 5 millisecond interrupt intervals, the program executes the identify routine at step 88 until the D-flag is again set at step 127 after an incipient wheel lockup condition is sensed.

Figure 9:
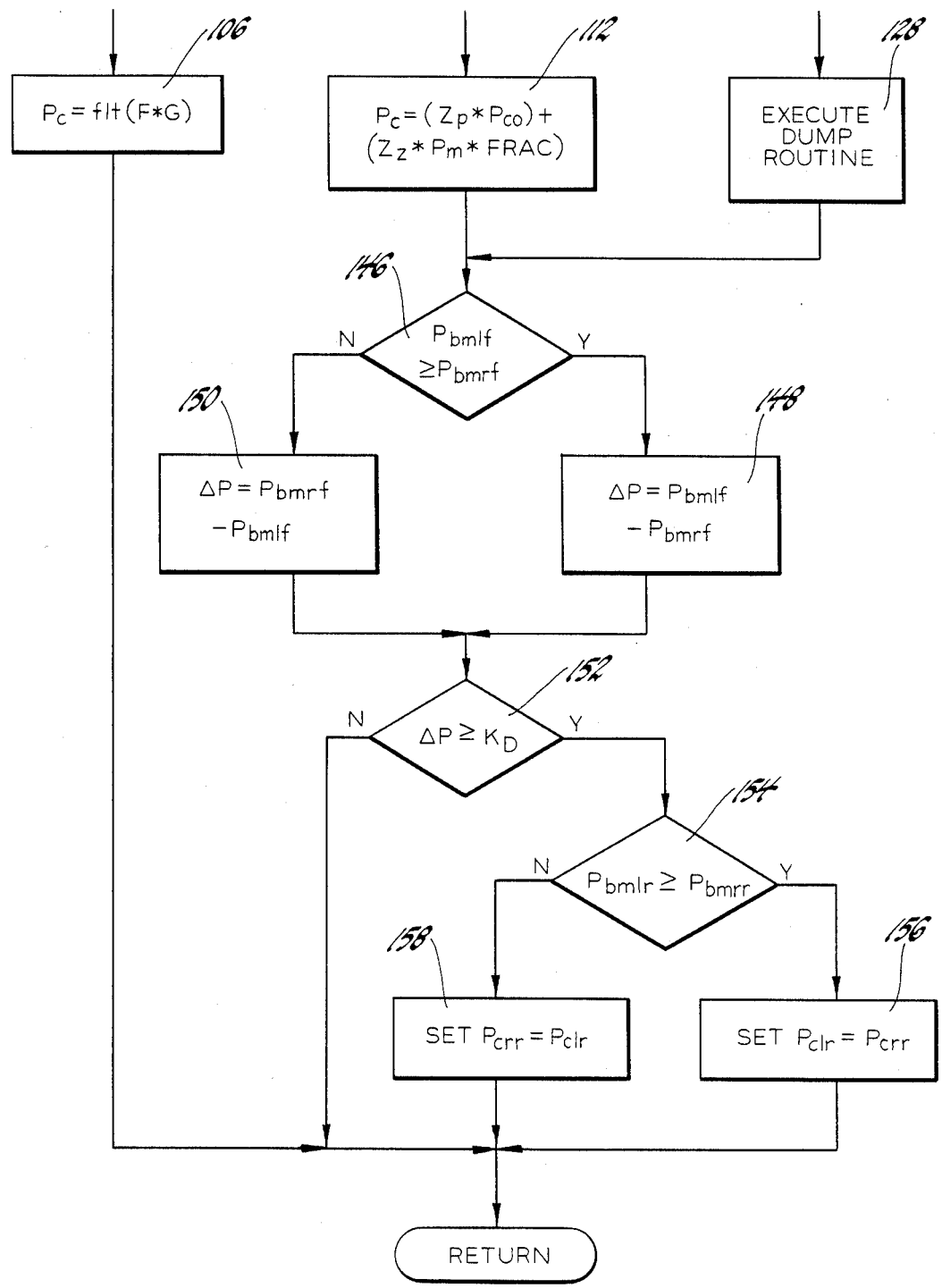

Control of the rear wheel brakes of the vehicle will now be described. The rear wheels are each controlled by identical program routines. The routine for controlling the hydraulic brake pressure to the brake of a rear wheel is the same as the above described routine for a front wheel brake except for the modification to the identify routine of FIG. 7 as illustrated in FIG. 9. The added program steps of FIG. 9 to the identify routine provide for the control of the operating mode of the rear wheel brakes in accord with the principles of this invention. Particularly, the routine senses when the vehicle wheels are being braked on a substantially uniform coefficient of friction surface and controls the braking of the rear wheel in an independent mode so as to minimize the vehicle stopping distance and senses when the coefficient of friction between the two sides of the vehicle are substantially different or when the vehicle is undergoing severe steering maneuvers while braking and controls the braking of the rear wheels in a select low mode where both wheels are jointly controlled based on the rear wheel being braked on the lowest coefficient of friction surface.

For purposes of differentiating the parameters associated with the four vehicle wheels, the designations lf, rf, lr and rr identifying the left front, right front, left rear and right rear wheels, respectively, will be added to the subscripts of the parameters previously referred to with respect to FIGS. 6-8.

Referring to FIG. 9, after the step 112 or the step 128 previously described, the program for controlling a rear wheel brake proceeds to a step 146 where the value of brake line pressure $P_{bmlf}$ stored at step 98 in the routine controlling the left front wheel brake is compared with the value of $P_{bmrf}$ stored at step 98 in the routine controlling the right front wheel brake. These values will be substantially equal if the two front wheels are being braked on substantially equal coefficient of friction surfaces in the absence of a severe steering maneuver but will be unequal by an amount related to the difference in the coefficient of friction between the left and right sides of the vehicle or by an amount related to the severity of a steering maneuver while braking. Other parameters, such as $T_{tmlf}$ and $T_{tmrf}$ may also be utilized to indicate braking on a split coefficient of friction surface or a severe steering maneuver while braking.

The values of $P_{bmlf}$ and $P_{bmrf}$ will be substantially equal when the vehicle is being braked on a split coefficient of friction surface or while undergoing a severe steering maneuver until the slip of the front wheel on the lowest coefficient of friction surface or on the inside of a turn during a severe steering maneuver exceeds the critical slip value at which time its determined value of tire torque $T_{tm}$ and the corresponding stored value of $P_{bm}$ is at its peak. The stored value of $P_{bm}$ of the front wheel on the highest coefficient of friction surface or on the outside of a turn during a severe steering maneuver will continue to increase as the determined value of tire torque increases. Therefore, a rear wheel having a lower value of $P_{bm}$ (or $T_{tm}$) is indicative of the wheel being braked on a road surface having a lower coefficient of friction surface or having a lower maximum possible tire torque due to a turning maneuver. The magnitude of the difference is indicative of the difference in the coefficients of friction or the degree or a severe steering maneuver while braking.

If $P_{bmlf}$ is equal or greater than $P_{bmrf}$, the program proceeds to a step 148 where $P_{bmrf}$ is subtracted from $P_{bmlf}$ to obtain the difference $\Delta P$. If $P_{bmrf}$ is less that $P_{bmlf}$ the program proceeds from step 146 to a step 150 where Pbmlf is subtracted from $P_{bmrf}$ to obtain the differrence $\Delta P$. As previously indicated, the value of $\Delta P$ is an indicator of the difference in the coefficient of friction between the left and right sides of the vehicle or an indicator of a severe steering maneuver.

From step 148 or 150, the program proceeds to a step 152 where $\Delta P$ is compared with a calibration constant $K_D$. A value of $\Delta P$ equal to or greater than $K_D$ represents a large difference in the coefficients of friction between the left and right sides of the vehicle or represents a severe steering maneuver of the vehicle while braking, both of which could result in reduced vehicle stability. If this condition exists, the program proceeds to a step 154 where the value of brake line pressure $P_{bmlr}$ stored at step 98 in the routine controlling the left rear wheel is compared with the value of $P_{bmrr}$ stored at step 98 in the routine controlling the right rear wheel to determine which rear wheel is being braked on the highest coefficient of friction surface.

In general, $P_{bmlr}$ and $P_{bmrr}$ will be substantially equal until the slip of the rear wheel on the lowest coefficient of friction surface exceeds the critical slip value at which time the corresponding stored value of $P_{bm}$ is at its peak. The stored value of $P_{bm}$ of the rear wheel on the highest coefficient of friction surface will continue to increase as the determined value of tire torque increases. Therefore, a rear wheel having a lower value of $P_{bm}$ is indicative of the wheel being braked on a road surface having a lower coefficient of friction surface.

If $P_{bmlr}$ is greater than $P_{bmrr}$ indicating that the left rear wheel is being braked on the higher coefficient of friction surface, the program proceeds to a step 156 where the commanded brake pressure $P_{clr}$ to the left rear brake is set equal to the value of the commanded brake pressure $P_{crr}$ to the right rear brake determined at step 112, 134 or 140 of the routine controlling the right rear brake.

If at step 154 $P_{bmrr}$ is determined to be greater than $P_{bmlr}$ indicating that the right rear wheel is being braked on the higher coefficient of friction surface, the program proceeds to a step 158 where the commanded brake pressure $P_{crr}$ to the right rear brake is set equal to the value of the commanded brake pressure $P_{clr}$ to the left rear brake determined at step 112, 134 or 140 of the routine controlling the left rear brake. From steps 156 or 158, the program exits the identify routine.

Through the steps 152, 154, 156 and 158, the pressure applied to the rear wheels during wheel lock controlled braking are controlled in the select low mode where the braking pressure applied to the rear wheel being braked on the highest coefficient of friction surface is controlled to the pressure established for the rear wheel being braked on the lowest coefficient of friction surface. However, if at step 152 it is determined that the coefficients of friction between the sides of the vehicle are not greatly different, the program exits the identify routine and the rear wheels are braked in an independent mode in the same manner as the front wheels so as to minimize the vehicle braking distance.

The foregoing description of a preferred embodiment for the purpose of explaining the principles of this invention is not to be considered as limiting or restricting the invention since many modifications may be made by the exercise of skill in the art without departing from the scope of the invention.

The embodiemnts of the invention in which an exclusive property or privilege is claimed are defined as follows:

1. A wheel lock control system for a vehicle having wheels including right and left front wheels and right and left rear wheels for transporting the vehicle over a roadway surface having varying coefficients of friction, each wheel having a brake responsive to a brake pressure for braking the wheel, the system comprising, in combination:

means for sensing a difference in the coefficients of friction of the roadway surface on the right and left sides of the vehicle;

control means for controlling the brake pressure to the brake of each wheel to prevent the wheel from locking, the control means having an independent braking mode wherein the brake pressure to the brake of each wheel is controlled independently and a select low braking mode wherein (A) the brake pressure to the brake of each of the right and left front wheels is controlled independentaly and (B) the brake pressure to the brake of each of the right and left rear wheels is controlled to a common pressure in response to predetermined conditions of the right or left rear wheel that is on the side of the vehicle at which the road surface has the lowest coefficient of friction; and means for setting the control means in the independent braking mode when the sensed difference in the coefficients of friction of the road surface on the right and left sides of the vehicle is less than a predetermined value and setting the control means in the select low braking mode when the sensed differnence in the coefficients of friction of the road surface of the left and right sides of the vehicle is greater than the predetermined value.

2. The wheel lock control system of claim 1 wherein the means for sensing a difference in the coefficients of friction of the roadway surface on the right and left sides of the vehicle includes means responsive to respective controlled brake pressures of the brakes of the front wheels.

3. A wheel lock control system for a vehicle having wheels including right and left front wheels and right and left rear wheels for transporting the vehicle over a roadway surface having varying coefficients of friction, each wheel having a brake responsive to a brake pressure for braking the wheel, the system comprising, in combination:

means for each wheel for (A) determining a maximum tire torque tending to accelerate the wheel during the application of brake pressure, (B) storing the value of brake pressure corresponding in time to the determined maximum tire torque following each applicaiton of brake pressure, (C) detecting an incipient wheel lockup condition of the wheel and (D) reapplying a brake pressure following said detected incipient wheel lockup condition at a value substantially equal to the last stored value of brake pressure;

means for determining the difference in the last stored brake pressures for the front wheels, the determined difference representing a difference in the coefficients of friction of the roadway on the right and left sides of the vehicle;

means for comparing the values of the last stored brake pressures for the rear wheels; and means responsive to said determined difference in the last stored brake pressures for the front wheels representing a predetermined differnece in the coefficients of friction of the roadway on the right and left sides of the vehicle for controlling the brake pressure applied to the brake of the rear wheel on the side of the vehicle at which the coefficient of friction of the roadway is the greatest equal to the value of the brake pressure applied to the rear wheel on the other side of the vehicle following said detected incipient wheel lockup condition.

4. The method of controlling the brake pressure applied to the brakes of the left and right rear wheels of a vehicle to prevent lockup of the rear wheels during braking on a roadway surface, comprising the steps of:

sensing the difference in the coefficients of friction of the roadway between the left and right sides of the vehicle;

independently controlling the brake pressures applied to the brakes of the right and left rear wheels so as to prevent wheel lockup of the rear wheels when the sensed difference in the coefficients of friction of the roadway between the left and right sides of the vehicle is less than a predetemrined amount; and controlling the brake pressure applied to each of the brakes of the right and left rear wheels to a common value determined to prevent wheel lockup of the rear wheel on the side of the vehicle at which the road surface has the lowest coefficient of friction surface when the sensed difference in the coefficients of friction between the left and right sides of the vehicle is greater than the predetermined amount.

* * * * *